(12) United States Patent
Roden

(10) Patent No.: US 6,182,328 B1
(45) Date of Patent: Feb. 6, 2001

(54) MOBILE CLEANING SYSTEM

(75) Inventor: Michael J. Roden, Prescott, AZ (US)

(73) Assignee: Professional Chemicals Corporation, Chandler, AZ (US)

( * ) Notice: Under 35 U.S.C. 154(b), the term of this patent shall be extended for 0 days.

(21) Appl. No.: 09/456,790

(22) Filed: Dec. 8, 1999

(51) Int. Cl.$^7$ ....................................... A47L 5/38
(52) U.S. Cl. ................................. 15/321; 15/339
(58) Field of Search ............................ 15/320, 321, 339, 15/353

(56) References Cited

U.S. PATENT DOCUMENTS

| | | | |
|---|---|---|---|
| 4,336,627 | 6/1982 | Bascus | 15/321 |
| 4,862,551 * | 9/1989 | Martinez et al. | 15/321 |
| 4,940,082 | 7/1990 | Roden | 15/321 |
| 5,165,139 | 11/1992 | Oxman | 15/321 |
| 5,265,304 * | 11/1993 | Hughs | 15/321 X |
| 5,371,918 * | 12/1994 | Shero | 15/321 |
| 5,430,910 * | 7/1995 | Wiley | 15/321 |

* cited by examiner

*Primary Examiner*—Chris K. Moore
(74) *Attorney, Agent, or Firm*—Cahill, Sutton & Thomas P.L.C.

(57) ABSTRACT

A mobile cleaning system in which an extraction blower is driven by a hydraulic circuit including a pump driven by the engine of the transport vehicle and a motor connected to the blower. The improvement comprises a heat exchanger for transferring heat from the hydraulic circuit to liquid extracted by the vacuum created by the blower.

4 Claims, 1 Drawing Sheet

MOBILE CLEANING SYSTEM

TECHNICAL FIELD

This invention is concerned with improving the drive system for a motor vehicle mounted vacuum cleaning system.

BACKGROUND ART

It is common for carpet and upholstery cleaning services to be performed from mobile units. The mobile unit includes a motor vehicle, such as a van, which carries means for heating and pressurizing cleaning fluid and a blower for creating a vacuum. Pressurized cleaning fluid is conveyed by a hose to a wand for spraying fluid onto the surface to be cleaned. Another hose connected to the blower and the wand carries spent cleaning fluid and debris from the surface back into the vehicle.

A complete system of this type is disclosed in U.S. Pat. No. 4,940,082 granted Jul. 10, 1990 to James R. Roden for "Cleaning System". In the system disclosed in this patent the pressurizing means and the blower are driven by a separate internal combustion engine dedicated specifically for that purpose.

There is, of course, another power plant available in the internal combustion engine used to propel the vehicle. And others have proposed to provide systems for driving the cleaning system pressurizing means and the blower from that engine, thus eliminating the cost of the separate engine.

One such drive system is disclosed in U.S. Pat. No. 4,336,627 granted Jun. 29, 1982 to Lionel D. Bascus for "Water Conditioning Systems". That system employs an electric clutch associated with the vehicle engine connected to a separate drive shaft which extends through the driver compartment back to a pump located in the cargo compartment.

Another drive system for transmitting power from the vehicle engine to the cleaning system is disclosed in U.S. Pat. No. 5,165,139 granted Nov. 24, 1992 to Myron P. Oxman for "Mobile Cleaning Unit". Oxman proposes to use a hydraulic power transfer system wherein the vehicle engine drives a hydraulic pump through a power take-off and the pump in turn drives a hydraulic motor connected to the pump and blower.

Internal friction in the hydraulic power takeoff circuit generates considerable heat in the circuit. The Oxman patent proposes to dispose of that heat through an oil cooler positioned in the cooling air stream for the vehicle engine. Preferably, this heat can be utilized to heat the cleaning fluid to be sprayed onto the surface to be cleaned.

Mobile cleaning systems can also be utilized in flood restoration work in which the powerful vacuum system is employed to pump water out of a flooded structure. When so utilized, however, no cleaning fluid is conveyed through the system and is therefore not available to remove heat from the hydraulic power takeoff circuit.

SUMMARY OF THE INVENTION

This invention envisions the provision of a heat exchanger between the hydraulic circuit and the liquid (predominantly water) drawn into the system. The returning liquid absorbs heat from and cools the hydraulic fluid in the hydraulic circuit.

Many mobile cleaning systems include a waste tank for holding liquid extracted from a surface being cleaned. This tank also captures water from the flooded structure when the system is used in flood restoration. In accordance with this invention the heat exchanger between the hydraulic circuit and the vacuumed flood water is positioned within the waste tank.

BRIEF DESCRIPTION OF THE DRAWINGS

The invention is described in greater detail hereinafter by reference to the accompanying drawings wherein.

BEST MODE FOR CARRYING OUT THE INVENTION

Figure 1:
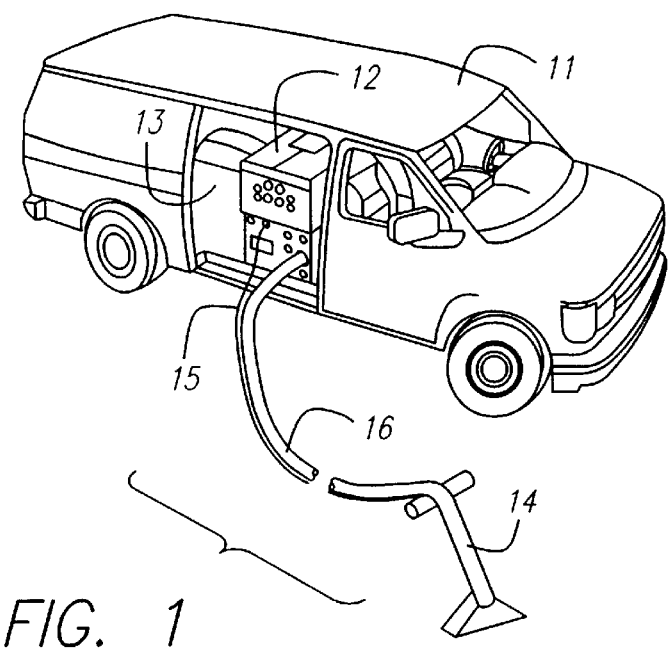
FIG. 1 is a perspective view of a motor vehicle carrying the mobile cleaning system of this invention.

In the drawings the reference numeral 11 designates a motor vehicle, in this case a van, for transporting the components of a surface cleaning and flood restoration system.

The cargo area of the vehicle 11 houses a console 12 and a waste tank 13 of the cleaning system. The system also comprises a cleaning wand 14 coupled to the console 12 by hoses 15 and 16. Hose 15 conveys pressurized and heated cleaning fluid to the wand 14 to be sprayed onto a surface being cleaned. Hose 16 conveys spent cleaning fluid (liquid) air and debris back to the console 12 from the wand 14.

Figure 2:
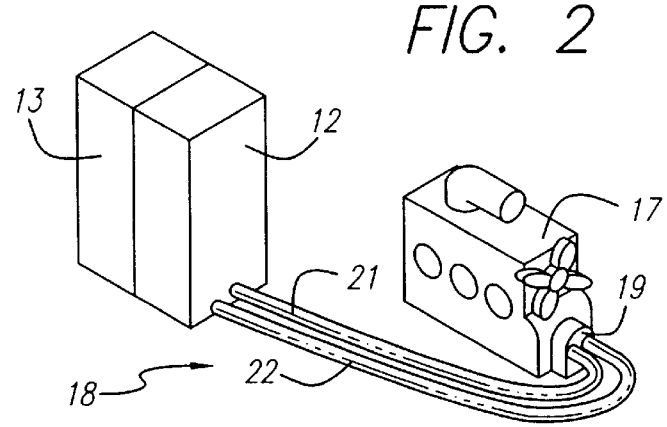
FIG. 2 is a somewhat diagrammatic perspective view of the vehicle engine and the cleaning system.

As depicted in FIG. 2, the components in the console 12 are powered by the vehicle engine 17 via a hydraulic power takeoff circuit indicated generally by reference numeral 18. The power takeoff circuit includes a hydraulic pump 19 which can be selectively coupled to the vehicle engine 17 and hydraulic fluid supply line 21 and a return line 22.

Figure 3:
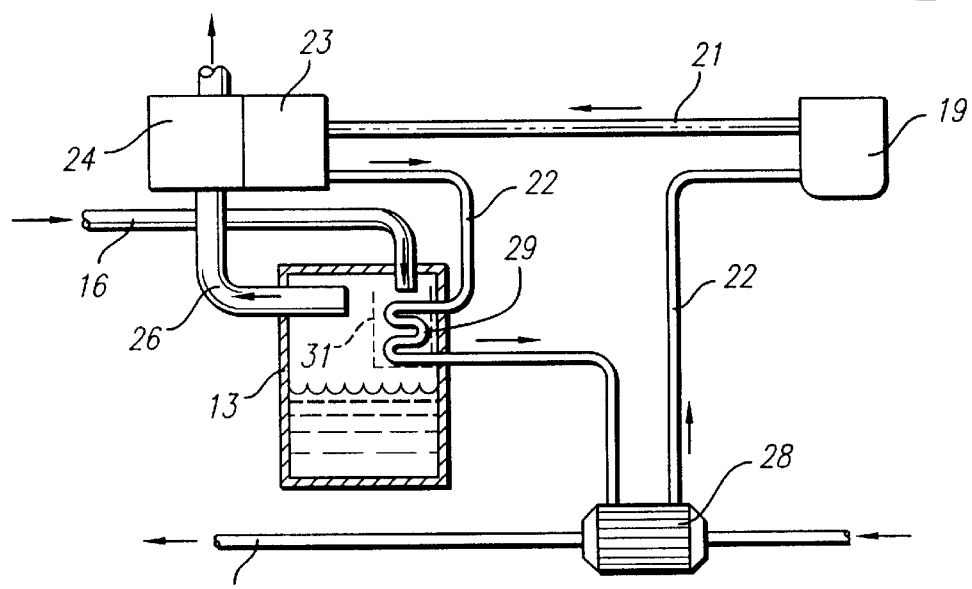
FIG. 3 is a diagrammatic representation of a hydraulic power takeoff circuit and related components of the cleaning system of the invention.

Inside the console 12 (See FIG. 3) a hydraulic motor 23 connected to lines 21 and 22 is coupled to a blower 24. The intake of blower 24 is connected via pipe 26 to the interior of waste tank 13. The interior of waste tank 13 is also in communication with vacuum hose 16 from wand 14. The vacuum created within waste tank 13 by the blower 24 draws spent cleaning fluid, air and debris into the tank when the system is operated to clean a surface. When the system is operating in its flood restoration mode the vacuum draws a substantially steady stream of water into the tank.

When the system is operating in its surface cleaning mode heat generated by friction in the hydraulic power takeoff 18 is removed and used advantageously to heat cleaning fluid via a heat exchanger 28 between hydraulic return line 22 and cleaning fluid supply hose 25.

When the system is operating in its flood restoration mode, however, no cleaning fluid pours through heat exchanger 28 and no heat is removed from the hydraulic circuit there.

In accordance with this invention the hydraulic circuit also includes a heat exchanger with the liquid extracted and conveyed into the waste tank 13. That heat exchanger 29 is preferably placed in a basket 31 beneath the outlet of hose 16 into tank 13. In the arrangement heat is extracted from the hydraulic circuit and the circuit cooled by extracted water flowing into the waste tank 13 even though no cleaning fluid is flowing through the cleaning system.

From the foregoing it should be apparent that this invention provides an improved cleaning system with a hydraulic power takeoff which can be operated in both a surface cleaning mode and a flood removal mode.

What is claimed is:

1. In a mobile cleaning system transportable by a motor vehicle and comprising an internal combustion engine for the vehicle, a hydraulic pump driven by the engine, a blower for creating a vacuum to extract liquid from an area outside the vehicle and for drawing the liquid inside the vehicle, a hydraulic motor for driving said blower, and a hydraulic circuit connecting said hydraulic motor to said hydraulic pump, the improvement comprising a heat exchanger between the extracted liquid and said hydraulic circuit for transferring heat from the hydraulic circuit to the extracted liquid.

2. The cleaning system of claim 1 further comprising a waste tank in the vehicle, and the vacuum created by said blower delivers the liquid to said waste tank and said heat exchanger is positioned inside that waste tank.

3. The cleaning system of claim 2 further comprising a cleaning fluid circuit for delivering cleaning fluid outside the vehicle, and a second heat exchanger between the hydraulic circuit and said cleaning fluid circuit for transferring heat from said hydraulic circuit to said cleaning fluid circuit.

4. The cleaning system of claim 1 further comprising a cleaning fluid circuit for delivering cleaning fluid outside the vehicle and a second heat exchanger between the hydraulic circuit and said cleaning fluid circuit for transferring heat from said hydraulic circuit to said cleaning fluid circuit.

* * * * *